UNITED STATES PATENT OFFICE.

OSCAR WARREN PICKERING, OF SPRINGFIELD, MASSACHUSETTS, ASSIGNOR TO PICKERING PAINT & PIGMENT COMPANY, A CORPORATION OF WEST VIRGINIA.

ALUMINOUS PIGMENT AND PAINT.

1,195,604.     Specification of Letters Patent.     Patented Aug. 22, 1916.

No Drawing.     Application filed October 10, 1914. Serial No. 865,986.

*To all whom it may concern:*

Be it known that I, OSCAR WARREN PICKERING, a citizen of the United States, residing at Springfield, in the county of Hampden and State of Massachusetts, have invented certain new and useful Improvements in Aluminous Pigment and Paint, of which the following is a specification.

This invention relates to a new pigment and paint thereof and has for some of its objects the production of a pigment or paint which will have, greater spreading power, less disintegrating or decomposing character when exposed to ingredients of or associated with the atmosphere, more permanency or stability when exposed to light, and less specific gravity, whereby the settling out from the paint vehicle is prevented, and which will be more readily miscible with oils or other vehicles than such substances as are commonly employed, such as verdigris (green), azurite (blue), etc., which will contain less copper and produce greater and better results, and it comprises a compound or composition of metal, such as copper, with aluminium and oxygen in the form of metal or copper aluminate or its equivalent and the same associated with a vehicle, such as a drying oil of the linseed type and in some cases with a diluent of drying nature, such as turpentine, in the form of paint or similar commodity.

When ordinary verdigris or azurite is employed in or as a paint associated with such vehicles as linseed oil or turpentine the specific gravity of the copper compound or composition which comprises a copper basic acetate or copper basic carbonate, is such that it soon separates or settles out from the mixed paint and is hard to remix again to a uniform consistency.

The copper aluminate which is preferred is the normal aluminate produced by the action of copper sulfate on sodium aluminate, which reaction may be illustrated by the following chemical formula or equation:—

$$Na_2Al_2O_4 + CuSO_4 + 5H_2O = CuAl_2O_4 + Na_2SO_4 + 5H_2O$$

The sodium sulfate byproduct is washed out of the copper aluminate precipitate and the copper aluminate produced thoroughly dried whereby a bluish green product of superior mixing qualities with oils and producing a paint which readily spreads and presents a body covering of great light diffusive qualities results.

The copper aluminate contains aluminium oxid in place of acetic acid of verdigris or carbon dioxid of the azurite and it is more permanent and less affected by decomposing ingredients of the atmosphere and is more readily assimilated with oils or other paint vehicles and especially with drying oils, such as linseed, tung, and the like, or the same associated with driers such as turpentine.

Instead of a pigment composed of copper aluminate *per se* the copper aluminate may be associated with aluminium hydroxid or hydrate or other metal hydroxid whereby the utility of the copper aluminate may be enhanced and its spreading power and permanency increased. This compound or composition of copper aluminate and aluminium hydroxid may be produced by acting on a mixture of an excess of sodium aluminate associated with copper sulfate with an equivalent of sulfuric or other acid capable of liberating aluminium hydroxid from the sodium aluminate whereby the two compounds viz. copper aluminate and aluminium hydroxid are simultaneously thrown down or precipitated from the aqueous solution of the compounds referred to in such an intimate state of division and admixture as to present the appearance of an actual chemical compound which might be considered a basic copper aluminate.

It will be noted that in the compound comprising copper aluminate that the percentage of copper in the compound over that in other copper compounds employed at the present time as paint is reduced and the bulk of the paint increased by the employment of the aluminate and the product thereof is much cheaper as to cost while at the same time it yields a product of great superiority over the old form of copper compounds both as to spreading power and resistance to atmospheric decomposition, thereby producing a product which is more permanent in character.

It is obvious that the copper aluminate may be produced in any convenient manner other than that described and that the pigment may be associated with any selective vehicle in producing the paint without departing from the spirit of the invention which broadly comprises a new paint or pigment containing a metal aluminate or its equivalent, or specifically copper aluminate, or either associated or combined with a metal hydroxid or hydrate or specifically aluminium hydroxid or hydrate, or such compounds or compositions associated with a paint vehicle, such as a drying oil (linseed) or the same with a drier (turpentine).

This new copper pigment or paint thereof includes many advantageous and valuable properties over and above that of a mere paint or color presentation in that it presents certain inherent properties of insecticide, germicide, fungicide, and preservative qualities and when applied to materials or substances adapted to contact with or be submerged in water it prevents the accumulation and anchoring of organic, vegetable or animal matter thereon, such as barnacles, etc., and therefore renders it particularly applicable to the painting of ships and the like.

In manufacturing, shipping, and dispensing of mixed paints the mineral constituents, such as copper aluminate as a pigment is of great utility, in that its lesser specific gravity than other copper compounds employed maintains it in a mixed or suspended condition in the paint vehicle, thus avoiding the settling out of the pigment to a great extent and yielding a more uniformly mixed paint and maintained as such, which is of greater utility, durability, spreading power, and practical utility, than pigments and paints of mixed character employed hitherto.

Any metal aluminate may be employed other than copper aluminate, such as aluminate of lead, chromium, iron, mercury, nickel, calcium, magnesium, etc., which aluminate may be of simple, compound, complex, or composite nature and may be associated with like or unlike metal hydroxid in chemical combination or physical association without departing from the spirit of my invention and any other metal hydroxid may be substituted for the aluminium hydroxid in the copper aluminate compound or composition, such as hydroxid of lead, zinc, etc.

It is obvious that the metal of the aluminate may exist at any atomicity and the aluminate may comprise the normal, basic, or other variety without departing from the spirit of the invention.

Some of the preferable species of aluminate employed comprise, and in connection with the present invention with preferable reference to cheapness and utility may be noted as, calcium aluminate, copper aluminate, and zinc aluminate, either *per se* or associated or combined with other substances, ingredients or vehicles.

It should be noted that the pigment comprising metal aluminate in accordance with the present invention as an ingredient of paint is of a flocculent character and nature which will readily take up and assimilate with oils and other vehicles and being preferably a precipitated product is of such pervious and flocculent nature that it remains suspended in, carried by, and permeated with the vehicle in a permanent manner as distinguished from dense vitreous products produced by fusion which do not assimilate with oils or other vehicles and easily settle out therefrom.

Having now described my invention what I claim as new and desire to secure by Letters Patent is:—

1. A new pigment comprising a flocculent metal aluminate.

2. A paint comprising a substantially water-insoluble metal aluminate and a vehicle.

3. A paint comprising metal aluminate and an oil.

4. A paint comprising metal aluminate and a drying oil.

5. A paint comprising metal aluminate, an oil and a drier.

6. A paint comprising metal aluminate, a drying oil, and a drier.

7. A paint comprising metal aluminate, an oil, and turpentine.

8. A paint comprising metal aluminate, a drying oil, and turpentine.

9. A new pigment comprising a copper aluminate.

10. A paint comprising a copper aluminate and a vehicle.

11. A paint comprising copper aluminate and an oil.

12. A paint comprising copper aluminate and a drying oil.

13. A paint comprising copper aluminate, an oil, and a drier.

14. A paint comprising copper aluminate, a drying oil, and a drier.

15. A paint comprising copper aluminate, an oil, and turpentine.

16. A paint comprising copper aluminate, a drying oil, and turpentine.

17. A new pigment comprising copper aluminate and aluminium hydroxid.

18. A paint comprising copper aluminate, aluminium hydroxid and a vehicle.

19. A paint comprising copper aluminate, aluminium hydroxid, and an oil.

20. A paint comprising copper aluminate, aluminium hydroxid, and a drying oil.

21. A paint comprising copper aluminate, aluminium hydroxid, an oil, and a drier.

22. A paint comprising copper aluminate, aluminium hydroxid, a drying oil, and a drier.

23. A paint comprising copper aluminate, aluminium hydroxid, an oil, and turpentine.

24. A paint comprising copper aluminate, aluminium hydroxid, a drying oil, and turpentine.

In testimony whereof I affix my signature in the presence of two witnesses.

OSCAR WARREN PICKERING. [L. S.]

Witnesses:
 J. H. REID,
 F. L. WHRITNER.